Sept. 9, 1958                    A. J. RHODES                    2,851,083
              SWIVEL TYPE ADJUSTABLE SEAT TRACK ASSEMBLY
Filed June 1, 1954                                        3 Sheets-Sheet 1

INVENTOR.
ALBERT J. RHODES
BY
Whittemore, Hulbert & Belknap
ATTORNEYS

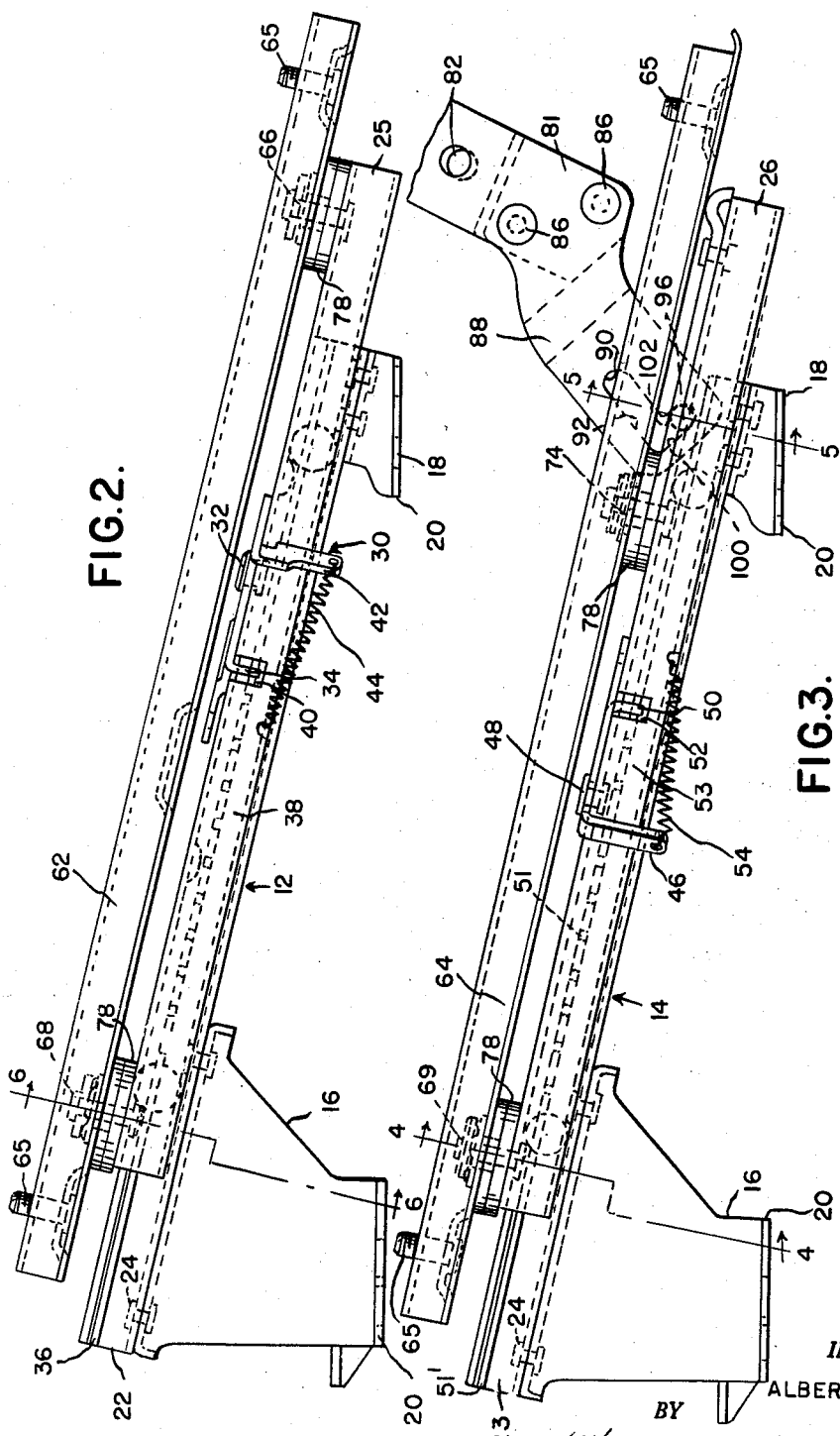

Sept. 9, 1958   A. J. RHODES   2,851,083
SWIVEL TYPE ADJUSTABLE SEAT TRACK ASSEMBLY
Filed June 1, 1954   3 Sheets-Sheet 3
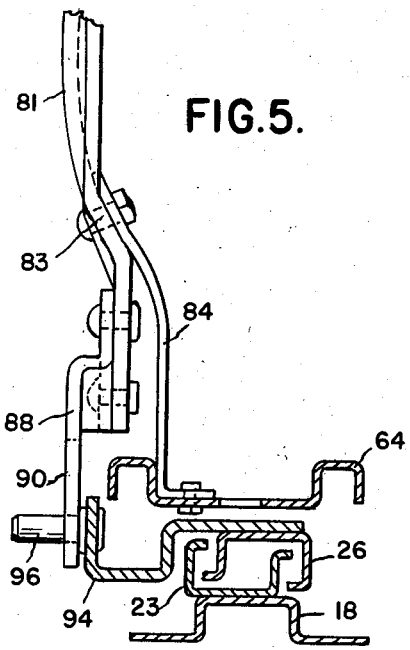
FIG.5.
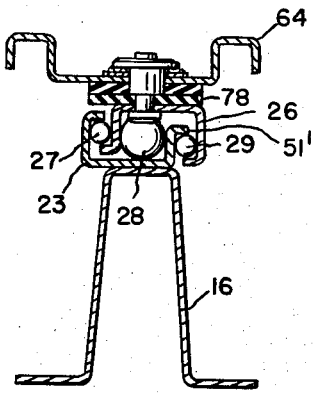
FIG.4.
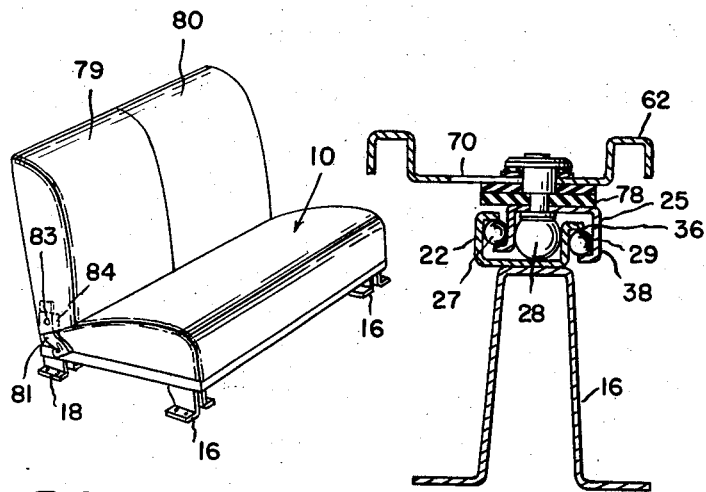
FIG.6.
FIG.7.
INVENTOR.
ALBERT J. RHODES
BY
*Whittemore, Hulbert & Belknap*
ATTORNEYS

United States Patent Office 2,851,083
Patented Sept. 9, 1958

2,851,083

SWIVEL TYPE ADJUSTABLE SEAT TRACK ASSEMBLY

Albert J. Rhodes, Lake Orion, Mich., assignor to American Forging & Socket Company, Pontiac, Mich., a corporation of Michigan Application June 1, 1954, Serial No. 433,420

10 Claims. (Cl. 155—5)

This invention relates to a swivel type adjustable seat track assembly.

The seat assembly of this invention is particularly adapted for use in connection with two-door automobiles. One object of the invention is to provide a seat assembly for an automobile, in particular a front seat assembly, which will provide more room for the passenger in the rear seat to get in and out of the right-hand door.

In modern two-door automobiles, even though the seat back is hinged for forward tilting, the clearance provided for getting into and getting out of the back seat is usually highly restricted. The difficulty is that the seat itself remains stationary, so that no additional foot clearance is obtained even though the seat back may be tilted. Accordingly, another object of this invention is to provide a front seat assembly which will enable increasing the foot space available for getting into and out of the back seat. In line with this object, it is a feature of the invention to provide a seat construction wherein the seat itself is automatically swiveled in a substantially horizontal plane in response to forward tilting of the seat back. When the seat back is again returned to upright position, the seat swivels back to its normal position transversely of the vehicle.

Still another object of the invention is to provide a swivel type seat assembly which is normally locked against swivel action so that such action cannot take place unless the seat back is tilted forwardly. Without the locking means referred to above, there is always the possibility that the sudden stopping of an automobile in motion will cause the seat to swivel by reason of its own inertia. This difficulty is overcome by the present construction which allows the seat to swivel only in response to forward tilting of the seat back.

Other objects of the invention will become apparent as the following description proceeds, especially when taken in conjunction with the accompanying drawings, wherein:

Figure 2 is a side elevational view of the left-hand seat supporting structure;

Figure 3 is a side elevational view of the right-hand seat supporting structure;

Figure 4 is a cross-sectional view taken along the line 4—4 on Figure 3;

Figure 5 is a cross-sectional view taken along the line 5—5 on Figure 3;

Figure 6 is a cross-sectional view taken along the line 6—6 on Figure 2; and

Figure 7 is a perspective view of a seat.

Figure 1:
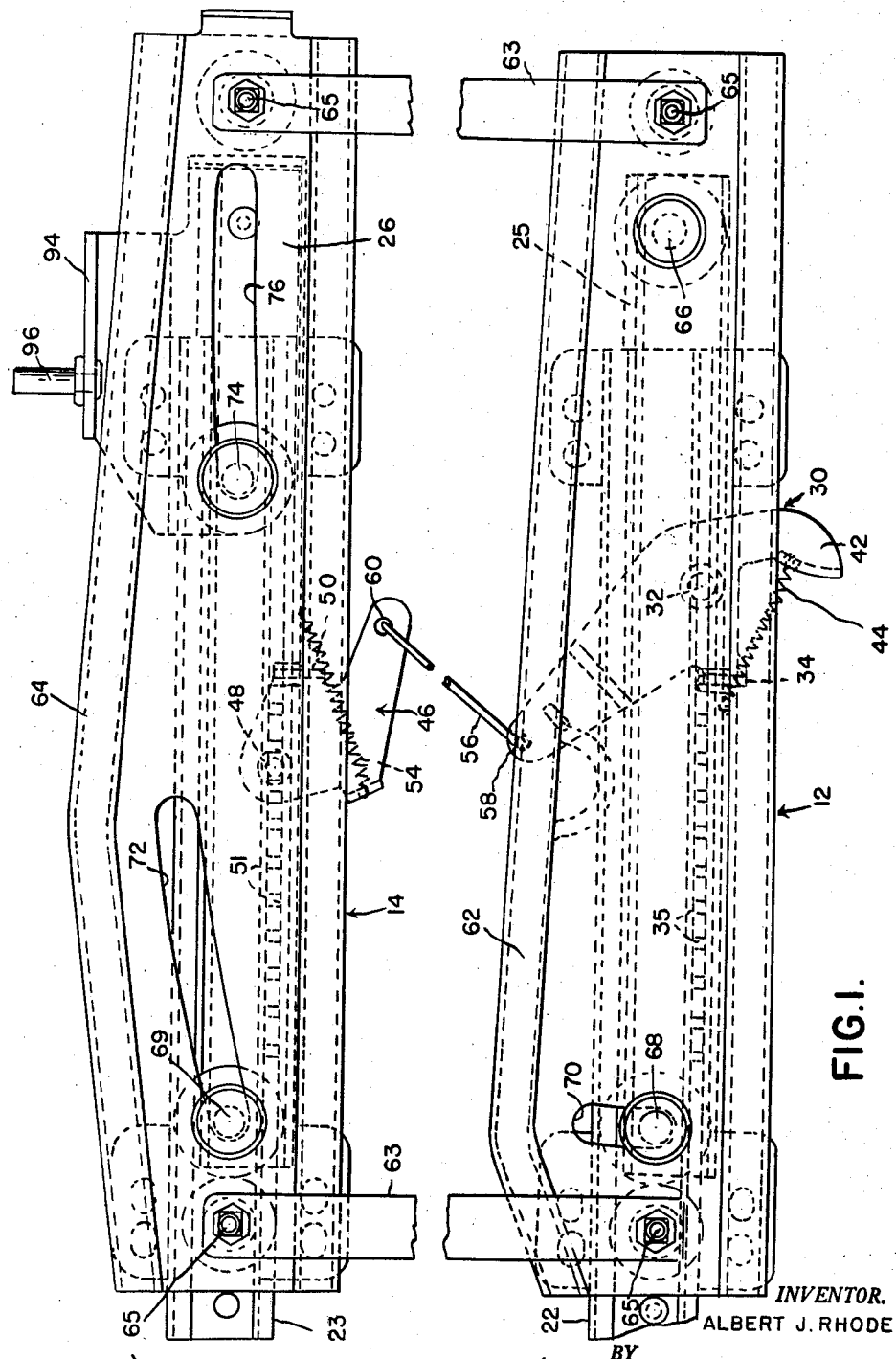
Figure 1 is a top plan view of the supporting structure for a front seat assembly.

Referring now more particularly to the drawings, the seat is generally indicated by the numeral 10 in Figure 7. This seat is normally disposed at right angles to the longitudinal centerline of an automobile, but is supported for swiveling movement in a generally horizontal plane as will appear below.

The seat supporting structure comprises a left-hand supporting structure 12 and a right-hand supporting structure 14. The supporting structures 12 and 14 each comprise a front mounting bracket 16 and a rear mounting bracket 18, these mounting brackets having apertured foot portions 20 for attachment to the floor of a vehicle.

Channel-shaped tracks 22 and 23 extend between the front and rear mounting brackets of the supporting structures 12 and 14 and are suitably secured thereto by rivets or the like indicated at 24. The tracks 22 and 23 are disposed in laterally spaced parallel relation and extend in a fore and aft direction relative to the vehicle. In addition, the mounting brackets are constructed in a manner such that the tracks are inclined downwardly and rearwardly, as is customary to support seat 10 at a comfortable incline.

The tracks 25 and 26 are of generally inverted channel cross section and are respectively mounted upon the tracks 22 and 23 for limited longitudinal sliding movement. Three series of ball bearings 27, 28 and 29 are interposed between the tracks of each supporting structure to facilitate relative sliding movement, and it will be noted that the edges of the track side walls are bent to provide laterally extending flanges for retaining the outer series of balls 27 and 29.

Suitable mechanism is provided for locking the tracks 25 and 26 in selected positions of longitudinal adjustment with respect to tracks 22 and 23. In detail, the left-hand supporting structure 12 has a lock lever 30 which is pivotally mounted on the upper side of track 25 by a stud 32. The lock lever 30 is formed with a lug 34 which is adapted to engage in any one of a series of spaced notches 35 provided along the edge of the flange 36 on track 22. The side wall 38 of track 25 is formed with an opening 40 for permitting lug 34 to move into and out of the notches. The lock lever 30 is formed with an actuating portion 42. The actuating portion 42 is adapted to be actuated by contact with the throw end of an auxiliary handle (not shown) to retract the lug 34 from a notch. If it is desired to operate the lock lever 30 directly by hand, the portion 42 would desirably extend out farther from its pivot axis than shown to give the operator more leverage. A tension coil spring 44 interconnects the lock lever 30 and the upper track 25 and urges the lock lever in a direction causing lug 34 to move toward the notches.

The right-hand supporting structure 14 is provided with a lock lever 46 pivotally mounted on the upper side of track 26 by a pin or stud 48. Lock lever 46 is formed with a lug 50 engageable in any of a series of spaced notches 51 formed along the edge of flange 51' on the track 23. The side wall 53 of track 26 is formed with an opening 52 for accommodating the lug, and a tension spring 54 interconnects the lock lever 46 and the upper track 26 urging the lock lever in a direction to cause lug 50 to enter any one of the notches.

A connecting rod 56 has its opposite ends pivotally connected to the respective lock levers at 58 and 60 so that actuation of the left-hand lock lever results in a similar movement of the right-hand lock lever 46. Accordingly the lock levers operate in unison to lock and unlock the upper and lower tracks of each supporting structure simultaneously.

Arranged in superimposed relation with respect to the respective upper tracks 25 and 26 are the elongated swivel plates 62 and 64. At opposite ends of each swivel plate are provided the attaching bolts 65 to which the frame of the seat is attached. These swivel plates are arranged in parallel relation and are retained in such relation by reason of their fixed attachment with the frame of the seat. By way of illustration, members 63, which may be seat frame members, are shown in Figure 1 extending between the swivel plates and connected to bolts 65, to maintain said plates in fixed parallel relation. The spacing between the swivel plates is of course the same as that between the upper tracks of the respective supporting structures.

The rear end portion of swivel plate 62 is pivotally connected to the rear end portion of track 25 by a stud 66 which extends upwardly at right angles to track 25. Studs 68 and 69 respectively interconnect the front end portions of the upper tracks 25 and 26. It will be noted that swivel plates 62 and 64 are respectively provided with slots 70 and 72 for slidably receiving the studs 68 and 69.

The rear end portion of swivel plate 64 is interconnected with the rear end portion of upper track 26 by a stud 74, and swivel plate 64 is formed with a slot 76 for slidably receiving stud 74.

The slots 70, 72 and 76 are each elongated and of arcuate configuration, being concentric with the axis of stud 66. Accordingly the swivel plates and the seat mounted thereon are permitted to turn in a slightly inclined but generally horizontal plane about the axis of stud 66, and the slots 70, 72 and 76 both guide and limit the swivel movement.

Anti-friction washers 78 are mounted on the studs 66, 68, 69 and 74 interposed between the swivel plates and the upper tracks to facilitate the swivel movement. These washers may be of nylon and also serve to support the plates in spaced relation above the upper tracks.

The seat back is pivoted to the seat frame about a generally horizontal axis for forward tilting movement from a normal substantially upright position. The seat back may be in the form of a continuous unitary structure extending from one side of the seat to the other or preferably it may be divided into two independent back sections 79 and 80 as shown in Figure 7. As seen in Figure 3, the numeral 81 designates the right-hand or outside leg of the right-hand seat back section 79. Leg 81 has an aperture 82 for receiving a pin 83 projecting from the hinge member 84, the latter being rigid with the seat frame, permitting tilting of the seat about the axis of pin 83. While in the present instance hinge member 84 is shown riveted to swivel plate 64, it will be understood that it may be secured directly to the seat frame, if desired. It will be noted that the axis of pin 83 extends transversely of the seat and seat supporting structure and that it is inclined downwardly and outwardly and in a slightly forward direction to cause the seat back section 79 to tilt not only forwardly but slightly inwardly.

Rigidly secured to the leg 81 as by the securing means indicated at 86 is a lever arm 88, the lower end portion of which is formed to provide a generally L-shaped slot 90. The leg 92 of slot 90 is elongated and extends radially with respect to the axis of pin 83.

A bracket 94 is secured to the top side of track 26 and extends laterally outwardly thereof having an outwardly projecting pin 96 fixedly secured thereto. The pin 96 is received in slot 90 and serves as a fulcrum pivot about which the lever arm 88 turns when the seat back section 79 is tilted forwardly. It will be apparent that the forward tilting of seat back section 79 about pin 83 will also operate to effect swiveling of the seat within the limits provided by the lengths of the slots 70, 72 and 76 by reason of the sliding connection between pin 96 and slot 90. It will be appreciated, of course, that forward tilting of seat back section 79 causes the leg 92 of slot 90 to move downwardly upon the pin, and leg 92 is of a length to accommodate pin 96 throughout the full extent of swiveling movement.

In order to prevent the seat from accidentally turning or swiveling as, for example, when the automobile is stopped suddenly, the slot 90 is provided with a laterally offset and rearwardly extending leg portion 100 which extends at right angles to portion 92. The pin 96 is received in leg portion 100 of the slot in the normal upright position of seat back section 79. It will be appreciated that in order for the seat to swivel, the seat back section 79 must tilt forwardly about pin 83 and the leg 92 of slot 90 must be free to move downwardly with respect to pin 96. However, such swiveling movement is prevented, when the seat back section is in its normal upright position, by reason of the wall 102 of the leg portion 100 of the slot which will bear against the pin and resist any accidental swiveling of the seat.

The pin 96 is easily cleared of the leg portion 100 of the slot by the initial forward tilting movement of the seat back section 79 whereupon further forward tilting of the seat back section accomplishes the swiveling movement of the seat. The portion 100 may be curved about the axis of pin 83, although this is not really necessary in view of the length of this portion.

It will be appreciated that seat back section 80 may also be pivoted to the seat for forward tilting about a pin such as 83.

The drawings and the foregoing specification constitute a description of the improved swivel type adjustable seat track assembly in such full, clear, concise and exact terms as to enable any person skilled in the art to practice the invention, the scope of which is indicated by the appended claims.

What I claim as my invention is:

1. Seat structure for a vehicle comprising a pair of laterally spaced parallel tracks, a seat extending across said tracks in superimposed relation thereto and having a pair of swivel plates secured to the underside respectively overlying said tracks and supporting said seat thereon, a back pivoted on said seat for forward tilting movement from a generally upright position, pivot means connecting one of said tracks to the overlying plate for swinging movement of said seat in a generally horizontal plane, a lever arm rigidly secured to said back and having a portion spaced from the pivotal connection between said seat and back, said portion having a slot therein, and a pin projecting from the other of said tracks, slidably received in said slot, whereby forward tilting of said back relative to said seat operates to swing said seat about said pivot means, said slot being formed with an offset recess arranged to be engaged by said pin in the upright position of said back and operative to lock said seat against swinging movement independently of forward tilting of said back.

2. Structure as defined in claim 1 in which said other track has a sliding connection with the overlying swivel plate, and means limiting the horizontal swinging of said seat.

3. Seat structure for a vehicle comprising first and second laterally spaced parallel tracks, a seat extending across said tracks in superimposed relation thereto and having a back pivoted to the rear of said seat for forward tilting movement from a generally upright position, said seat having first and second swivel plates secured to the underside extending from front to rear of said seat and respectively overlying the first and second tracks and supporting said seat thereon, pivot means connecting the rear end portion of said first track to said first plate for swinging movement of said seat in a generally horizontal plane, a lever arm rigidly secured to said back and having a portion spaced from the pivotal connection between said seat and back, said portion having a slot therein elongated in a direction extending radially of said pivotal connection, and a pin projecting from the second track slidably received in said slot, whereby forward tilting of said back relative to said seat operates to swing said seat about said pivot means, said slot having a laterally offset recess at one end adapted to be engaged by said pin in the upright position of said back and operative to lock said seat against swinging movement independently of forward tilting of said back.

4. Structure as defined in claim 3, in which slots are formed at the front ends of said plates and at the rear end of said second plate respectively concentric with said pivot means, pins on said tracks respectively slidably received in said last-mentioned slots for guiding the swinging movement of said seat, and means limiting swinging movement of said seat about said pivot means.

5. Seat structure for a vehicle comprising supporting structure, a seat having a back pivoted thereto for forward tilting movement from an upright position relative to said seat, pivot means connecting said seat to said supporting structure for swinging movement of said seat in a generally horizontal plane, a lever arm rigidly secured to said back and having a portion spaced from the pivotal connection between said seat and back, said portion having a slot therein, and a pin fixed on said supporting structure slidably received in said slot whereby forward tilting of said back relative to said seat operates to swing said seat about said pivot means, said slot being formed with an offset recess arranged to be engaged by said pin in the upright position of said back and operative to lock said seat against swinging movement independently of forward tilting of said back.

6. Seat structure for a vehicle comprising support structure, a seat having a back pivoted thereto for forward tilting movement from an upright position relative to said seat, pivot means connecting said seat to said supporting structure for swinging movement of said seat in a generally horizontal plane, a member rigidly carried by said back being spaced from the pivotal connection between said seat and back, a member carried by said supporting structure, one of said members having a slot therein and the other member having a pin slidably received in said slot whereby forward tilting of said back relative to said seat operates to swing said seat about said pivot means, said slot being formed with an offset recess arranged to be engaged by said pin in the upright position of said back and operative to lock said seat against swinging movement independently of forward tilting of said back.

7. Seat structure for a vehicle comprising supporting structure, a seat having a back pivoted thereto for forward tilting movement from an upright position, means mounting said seat on said supporting structure for movement relative thereto, said back having a member provided with a portion spaced from said pivoted connection between said seat and back, means fixed relative to said supporting structure providing a fulcrum engageable with said portion of said member to effect movement of said seat in response to forward tilting of said back from the upright position of the latter, said member having a second portion engageable with said fulcrum in the upright position of said back to lock said seat against movement relative to said supporting structure independently of forward tilting of said back.

8. Seat structure as defined in claim 7 in which said portions of said member are surfaces thereof slidably engageable with said fulcrum.

9. Seat structure as defined in claim 8 in which said surfaces connect into each other at a substantial angle.

10. Seat structure as defined in claim 9 in which said fulcrum effects forward movement of said seat in response to forward tilting of said back.

References Cited in the file of this patent

UNITED STATES PATENTS

| | | |
|---|---|---|
| 1,713,980 | Saives | May 21, 1929 |
| 2,160,015 | Haberstump | May 30, 1939 |
| 2,189,396 | Greig | Feb. 6, 1940 |
| 2,737,229 | Semar | Mar. 6, 1956 |